United States Patent
Gopalakrishnan et al.

(10) Patent No.: US 11,053,076 B1
(45) Date of Patent: Jul. 6, 2021

(54) CARTON INDUCTION OPTIMIZATION IN ORDER FULFILLMENT PICKING SYSTEM

(71) Applicant: Staples, Inc., Framingham, MA (US)

(72) Inventors: Vikranth Gopalakrishnan, Grafton, MA (US); Daniel Jarvis, Windemere, FL (US); Rodney Gallaway, McRae, AR (US); Michael Bhaskaran, Seattle, WA (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 16/687,519

(22) Filed: Nov. 18, 2019

Related U.S. Application Data

(63) Continuation of application No. 16/108,012, filed on Aug. 21, 2018, now Pat. No. 10,479,612, which is a continuation of application No. 15/460,130, filed on Mar. 15, 2017, now Pat. No. 10,099,864.

(60) Provisional application No. 62/308,627, filed on Mar. 15, 2016.

(51) Int. Cl.
| | |
|---|---|
| *B65G 1/137* | (2006.01) |
| *G06Q 10/08* | (2012.01) |
| *B65G 43/08* | (2006.01) |
| *B07C 5/00* | (2006.01) |

(52) U.S. Cl.
CPC .............. *B65G 1/1376* (2013.01); *B07C 5/00* (2013.01); *B65G 1/137* (2013.01); *B65G 1/1373* (2013.01); *B65G 43/08* (2013.01); *G06Q 10/087* (2013.01); *B65G 2203/0208* (2013.01); *B65G 2203/0283* (2013.01); *B65G 2203/0291* (2013.01)

(58) Field of Classification Search
CPC .................................................. B65G 1/1376
See application file for complete search history.

(56) References Cited

U.S. PATENT DOCUMENTS

| | | | |
|---|---|---|---|
| 5,038,911 A | 8/1991 | Doane et al. | |
| 5,267,638 A | 12/1993 | Doane | |
| 6,513,641 B1 * | 2/2003 | Affaticati | B07C 5/36 198/357 |
| 7,191,895 B2 | 3/2007 | Zeitler et al. | |
| 8,335,585 B2 | 12/2012 | Hansl et al. | |
| 8,408,380 B2 | 4/2013 | Doane | |
| 8,560,114 B2 | 10/2013 | Suess et al. | |
| 8,886,356 B2 | 11/2014 | Magato et al. | |
| 8,983,647 B1 * | 3/2015 | Dwarakanath | G05D 1/0217 700/216 |
| 9,129,247 B2 | 9/2015 | Hara et al. | |
| 9,280,756 B2 | 3/2016 | Hara et al. | |
| 9,733,633 B2 | 8/2017 | Wickham et al. | |

(Continued)

*Primary Examiner* — Thomas Randazzo
(74) *Attorney, Agent, or Firm* — VLP Law Group, LLP

(57) ABSTRACT

Technology for optimizing carton induction in an order fulfillment picking system is described. In an example embodiment, a method, implemented using one or more computing devices, may include receiving scan data reflecting status of cartons being conveyed by a conveying system, receiving confirmatory input reflecting pick completion for a subset of the cartons being conveyed by the conveying system, and generating an estimated time of arrival for one or more cartons not yet inducted into the conveying system based on the scan data and the confirmatory input. The method may further include generating a load forecast based on the estimated time of arrival and inducting one or more of the one or more cartons into the conveying system based on the load forecast.

20 Claims, 10 Drawing Sheets

(56) References Cited

U.S. PATENT DOCUMENTS

| | | |
|---|---|---|
| 10,099,864 B1 | 10/2018 | Gopalakrishnan et al. |
| 2004/0195078 A1* | 10/2004 | Anderson .............. B65G 43/08 |
| | | 198/781.05 |
| 2006/0182543 A1* | 8/2006 | Schaefer ................ B65G 1/137 |
| | | 414/222.01 |
| 2006/0206235 A1* | 9/2006 | Shakes ................. B65G 1/1373 |
| | | 700/216 |
| 2007/0010909 A1 | 1/2007 | Bonora et al. |
| 2009/0299521 A1* | 12/2009 | Hansl ................... B65G 1/1378 |
| | | 700/215 |
| 2012/0150340 A1 | 6/2012 | Suess et al. |
| 2013/0138515 A1* | 5/2013 | Taniguchi ............ G06Q 10/087 |
| | | 705/15 |
| 2014/0180468 A1* | 6/2014 | Winkler ................ G06Q 50/28 |
| | | 700/216 |
| 2014/0279294 A1* | 9/2014 | Field-Darragh ..... H04B 5/0062 |
| | | 705/28 |
| 2014/0290827 A1 | 10/2014 | Heeman |
| 2017/0116565 A1* | 4/2017 | Feiner ................ G06Q 10/0832 |

* cited by examiner

US 11,053,076 B1

CARTON INDUCTION OPTIMIZATION IN ORDER FULFILLMENT PICKING SYSTEM

BACKGROUND

This application relates to inventory management systems.

In current inventory management systems, container induction is often based on a manual inference of scattered, insufficient, and non-integrated data points. This can lead to bottlenecks and poor distribution of resources. Even "autonomous" systems are often still semi-automated at best and only provide a snapshot of containers in the system at a given time. The operators then have to interpret and use their judgment to manually select containers and induct what seems to be the most appropriate one at the time. For instance, operators often base decisions on a fixed, first pick logic (which is typically based on a fixed sequence) with limited visibility of current system load and no visibility of future system load.

These manual induction decisions are frequently incorrect and lead to sub-optimal flow (e.g., bottlenecks, lower than optimal productivity, low utilization and throughput, higher than optimal cycle time) because of a lack of visibility into the system. For instance, container induction in these systems occurs with little or no understanding of its impact on the downstream labor impact of the operation.

SUMMARY

According to one innovative aspect of the subject matter described in this disclosure, a system includes a computer processor and a non-transitory computer readable medium storing instructions that, when executed by the computer processor, are configured to perform operations including: receiving scan data reflecting status of cartons being conveyed by a conveying system; receiving confirmatory input reflecting pick completion for a subset of the cartons being conveyed by the conveying system; generating an estimated time of arrival for one or more cartons not yet inducted into the conveying system based on the scan data and the confirmatory input; generating a load forecast based on the estimated time of arrival; and inducting one or more of the one or more cartons into the conveying system based on the load forecast.

In general, another innovative aspect of the subject matter described in this disclosure may be embodied in methods that include the operations described in reference to the system above.

In general, another innovative aspect of the subject matter described in this disclosure may be embodied in a carton induction optimization system that includes a conveyor control system communicatively coupled to receive scan data from one or more conveyor scanners, the scan data reflecting the status of cartons being conveyed by a conveying system, the conveyor control system communicatively coupled to a warehouse execution system; a picking system configured to receive confirmatory input, the confirmatory input reflecting pick completion for a subset of the cartons being conveyed by the conveying system, the picking system communicatively coupled to the warehouse execution system. The carton induction optimization system may include a warehouse execution system configured to receive the scan data from the conveyor control system and the confirmatory input from the picking system; generate an estimated time of arrival for one or more cartons not yet inducted into the conveying system based on the scan data and the confirmatory input; generate a load forecast based on the estimated time of arrival; and induct one or more of the one or more cartons into the conveying system based on the load forecast.

These and other embodiments may each optionally include one or more of the following features, such as: that the load forecast includes an estimate, for a given future point in time, of a carton load being processed by the conveying system; that the scan data includes a zone dwell time, the zone dwell time representing a duration of time that a carton spent in a given zone of the conveying system; that generating the estimated time of arrival is further based on conveyor velocity of the conveying system; that generating the load forecast is further based on a quantity of the cartons being conveyed by conveying system; that generating the load forecast includes classifying sections of the conveying system as satisfying a threshold load level and not satisfying the threshold load level; that the estimated time of arrival is further based on an expected destination of the cartons being conveyed by the conveying system; and that the picking system is a pick-to-voice or a pick-to-light system.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

The technology described herein addresses the problems described in the Background Section. For instance, the technology can interpret data being received in real time and measure the impact of inducting various cartons on system load. The technology can determine impact based on the current system load and a forecast of system load. These latter two factors can be determined based at least in part on data describing the current containers/cartons in the system and the available batch of inductable containers, as described in further detail below.

The technology described herein can be integrated into any logistics system, such as a conveyor control system, warehouse control system, warehouse execution system 102, warehouse management system 104, etc., to manage the flow of containers in a zone-to-zone picking order fulfillment system. This technology beneficially improves productivity and throughput, increases asset utilization, and lowers cycle time and labor costs. These benefits, in turn, lead to shorter delivery times and result in significant savings and business value.

Figure 1:
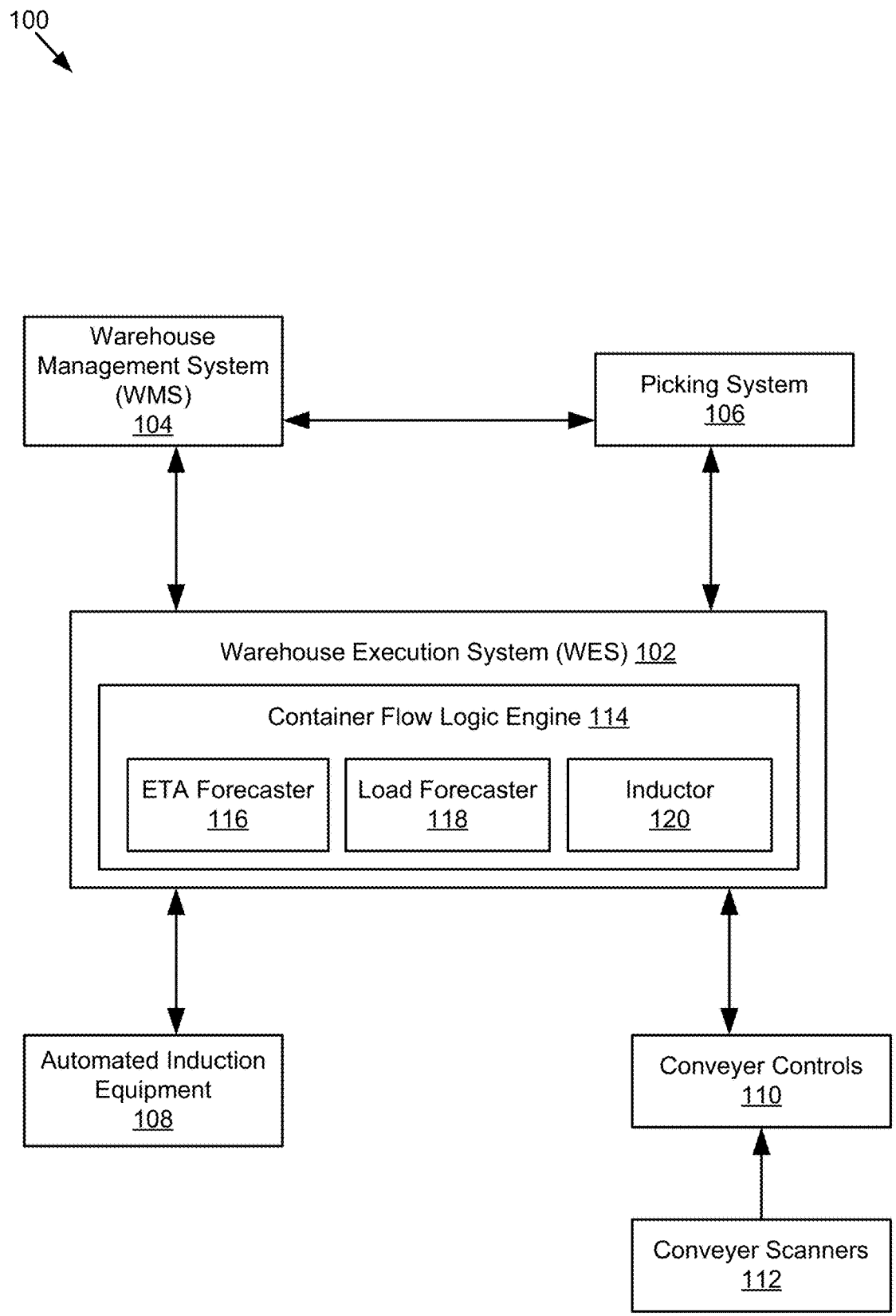
FIG. 1 is a block diagram of an example system and data communication flow for induction optimization in an order fulfillment picking system.

FIG. 1 is a block diagram of an example system 100 and data communication flow for induction optimization in a zone-to-zone conveyor order fulfillment picking system. The system 100 may include a warehouse execution system (WES) 102. The WES 102 is coupled to conveyor controls 110, conveyor scanners 112, automated induction equipment 108, a warehouse management system (WMS) 104, and a picking system 106. These components may be coupled to exchange data via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some embodiments, one or more of these components may be coupled via a data communications bus.

The WES 102 may, in some embodiments, include one or more hardware and/or virtual servers programmed to perform the operations, acts, and/or functionality described herein. For instance, the WES 102 may include a container flow logic engine 114 and the container flow logic engine 114 may include an estimated time of arrival (ETA) forecaster 116, a load forecaster 118, and an inductor 120. These components may comprise software routines storable in one or more non-transitory memory devices and executable by one or more processors of the WES 102 to carry out the operations, acts, and/or functionality described herein. In further embodiments, these routines may be embodied in electrical hardware that is operable to carry out the operations, acts, and/or functionality described herein.

The container flow logic engine 114 is configured to optimize the container flow through the conveying system. The conveying system or conveyor system is comprised of standard conveying components, such as zones, inclines, declines, accumulation areas, transportation conveyor sections, etc., that are controlled by the conveyor controls 110. The conveying system includes conveying scanners at different points along the conveying system. Operators use conveying scanners to scan cartons as they proceed through different zones of the conveying system. Example containers include outbound shipping cartons, envelopes, totes, etc.

In some embodiments, the conveying system includes a plurality of pick zones in which various products are picked and placed into the cartons. A pick zone may include one or more pick lines and the conveying system may route a given outbound container into a particular pick line based on instructions received from the conveyor controls 110. The conveyor controls 110 may be controlled by the WES 102 based on the determinations made by the container flow logic engine 114. Often, an outbound container my need to proceed through multiple pick lines in order for its pick list to be fulfilled. These pick lines may be located in disparate pick zones.

Automated induction equipment 108 may include mechanical components of the conveying system for inducting containers, broken packs, cartons, etc., into the conveyor system. The automated induction equipment 108 may include a communication unit that is communicatively coupled to receive instructions from the WES 102. In response to receiving instruction messages from the WES 102, such as a load forecast or the induction determination, as discussed elsewhere herein, the automated induction equipment 108 may automatically build and/or release a carton for induction into the conveyor system for fulfillment of orders or lines, according to the techniques described herein.

The WMS 104 may, in some embodiments, include one or more hardware and/or virtual servers or software routines storable in one or more non-transitory memory devices and executable by one or more processors to perform the operations, acts, and/or functionality described herein. The WMS 104 may be configured to store and maintain carton data. The carton data includes information about each carton in the system, such as a unique identifier for each carton, a carton type, the zones the carton will visit, the number of pick lines the carton proceed through, and the priority for the carton. Some cartons may have a higher priority relative to other cartons and the conveying system may expedite handling of those cartons with higher priority relative to other cartons in the system. The carton data may include a picklist defining the items the carton will contain. The WMS 104 system stores data mapping these items to the different pick zones. The WMS 104 may be configured to communicate the carton data with the WES 102 or the picking system 106 in real time, in batches, as requested by the WES 102 or picking system 106, etc.

The picking system 106 may, in some embodiments, include one or more hardware and/or virtual servers or software routines storable in one or more non-transitory memory devices and executable by one or more processors to perform the operations, acts, and/or functionality described herein. The picking system 106 may receive pick confirmations, for example, from operators (e.g., using barcode scanners, NFC, RFID chips, or other sensors or input methods) working within a pick zone confirming that picks for a given carton have been completed, as described in further detail below. An example picking system 106 may include a currently available pick-to-voice or a pick-to-light system. The picking system 106 may be configured to communicate the pick confirmations data with the WES 102 or WMS 104 in real time, in batches, as requested by the WES 102 or WMS 104, etc.

The container flow logic engine 114 includes an ETA (expected time of arrival) forecaster. The ETA forecaster 116 may estimate the expected time of arrival of a given container, which may not be currently inducted in the conveying system, from the point of induction to each pick zone that the container needs to visit in order for the items in its picklist to be placed into the container. The ETA forecaster 116 generates this estimated ETA based on a set of acceptable static/dynamic routes. As multiple different routes may apply, ETA forecaster 116 can determine ETAs for multiple routes and select the ETA/route that is the best match based on current conditions.

The ETA forecaster 116 can calculate the ETA of a given container based on a real time or lag time basis of other containers currently in the system. The ETA forecaster 116 performs a basis calculation using a combination of one or more of the following data points: 1) conveyor velocity; 2) conveyor scanner confirmations; 3) pick confirmations; 4) and zone dwell time.

Conveyor scanner confirmations. The conveyor scanners 112 (zone divert scanners, routing scanners, manual scanners, etc.) may generate scan data by, for example, scanning cartons as they proceed through various checkpoints of the conveyor system. The conveyor scanners 112 communicate the scan data to the conveyor controls 110, which in turn communicates the data to the WES 102. Scan data includes a time stamp and carton # for each scanned carton, as well as unique information identifying the scanner.

Pick confirmations. The picking system 106 receives confirmatory input from operators working within a pick zone. The confirmatory input confirms that picks for a given carton have been completed. The picking system 106 transmits the confirmatory input to the WES 102. The confirmatory input may include the time stamp reflecting completion of the picks in the zone, a unique identifier identifying the picker (operator), and a unique identifier identifying the pick zone, and the unique identifier identifying the carton (e.g. a carton number).

Zone dwell time. The zone dwell time reflects the time that a carton spent in a given zone. In some embodiments, the zone dwell time is determined by computing the difference in time between a zone divert confirmation scan for a carton and the time stamp from the pick confirmation for the carton in that zone.

Conveyor velocity. Input from conveyor controls system 110 shows planned or actual cartons per minute (CPM). In some instances, conveyor velocity may also be estimated from conveyor scan confirmations (e.g., registered time between two successive scan points a container passes) or measured using a conveyor velocity sensor.

The container flow logic engine 114 may further include a load forecaster 118. The load forecaster 118 is operable to estimate, for a given future point in time, the load being processed by the conveyor system. In particular, the load forecaster 118 may estimate how many containers may be located in different predetermined points of the conveyor system, such as pick zones, inclines, declines, accumulation areas, transportation conveyor sections, etc., at a future point in time. Load forecaster 118 calculates these estimates based on a number of data points including, but not limited to, the current locations of the containers in the conveyor system, outputs from ETA forecaster 116, and the characteristics of the different containers available for induction. Further constraints evaluated by the load forecaster 118 may include throughput capacity of entire system, various points of the conveyor system (e.g. zones), various other predefined thresholds, etc.

The load forecaster 118 may generate a forecast classifying the various different points of the conveying system for that future point in time. For example, based on the load forecast and a user defined load threshold, the load forecaster 118 may classify specific sections of conveyor including zones using a quantitative measure, such as hot or cold (e.g., load satisfying or above a certain threshold is hot and load not satisfying or below the same or lower threshold is cold), percent utilization, etc. The future point in time may be n-minutes from the current point in time.

Figure 3A:
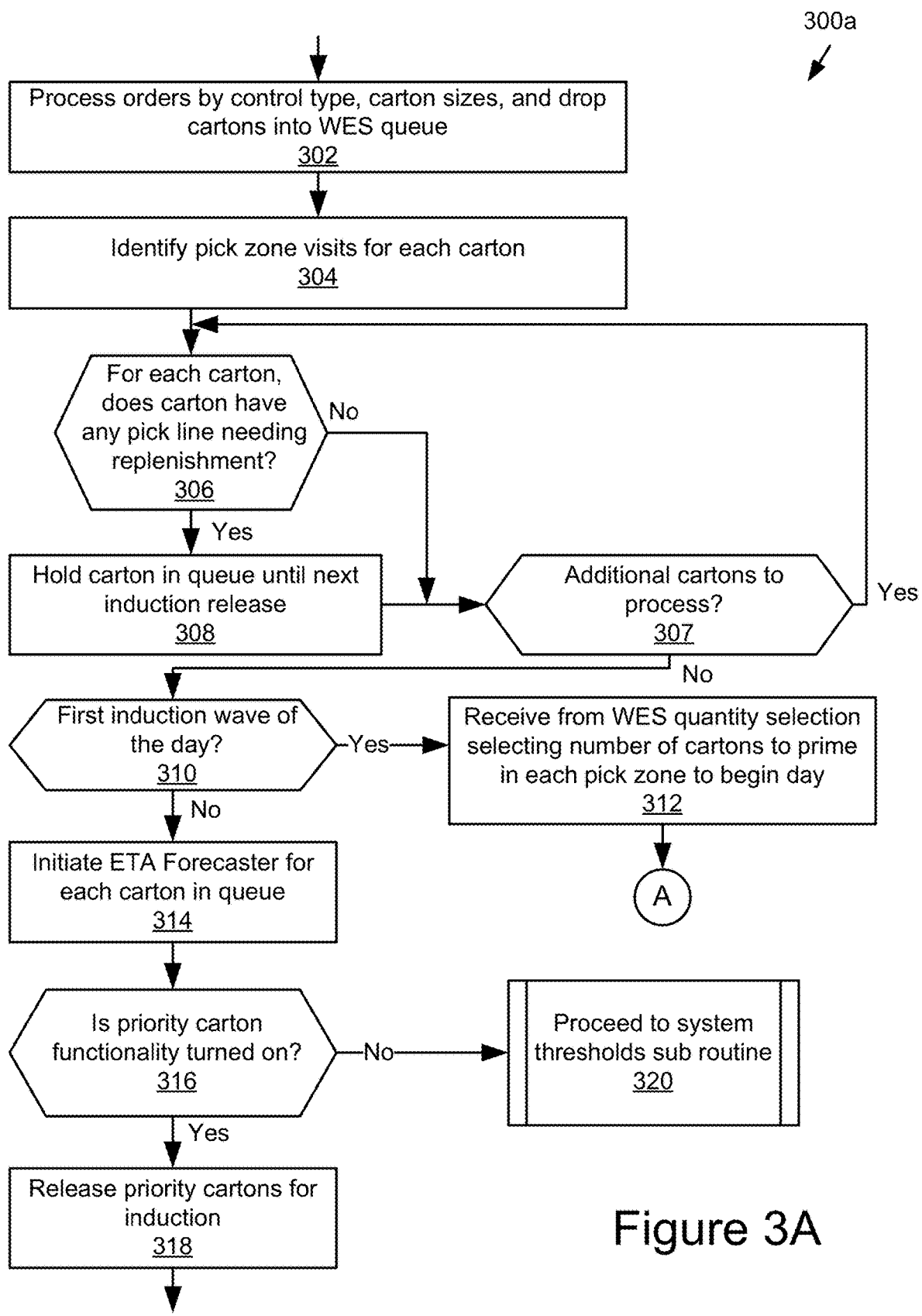
FIGS. 3A and 3B are flowcharts of an example method for conducting one or more cartons in a conveying system.
Figure 3B:
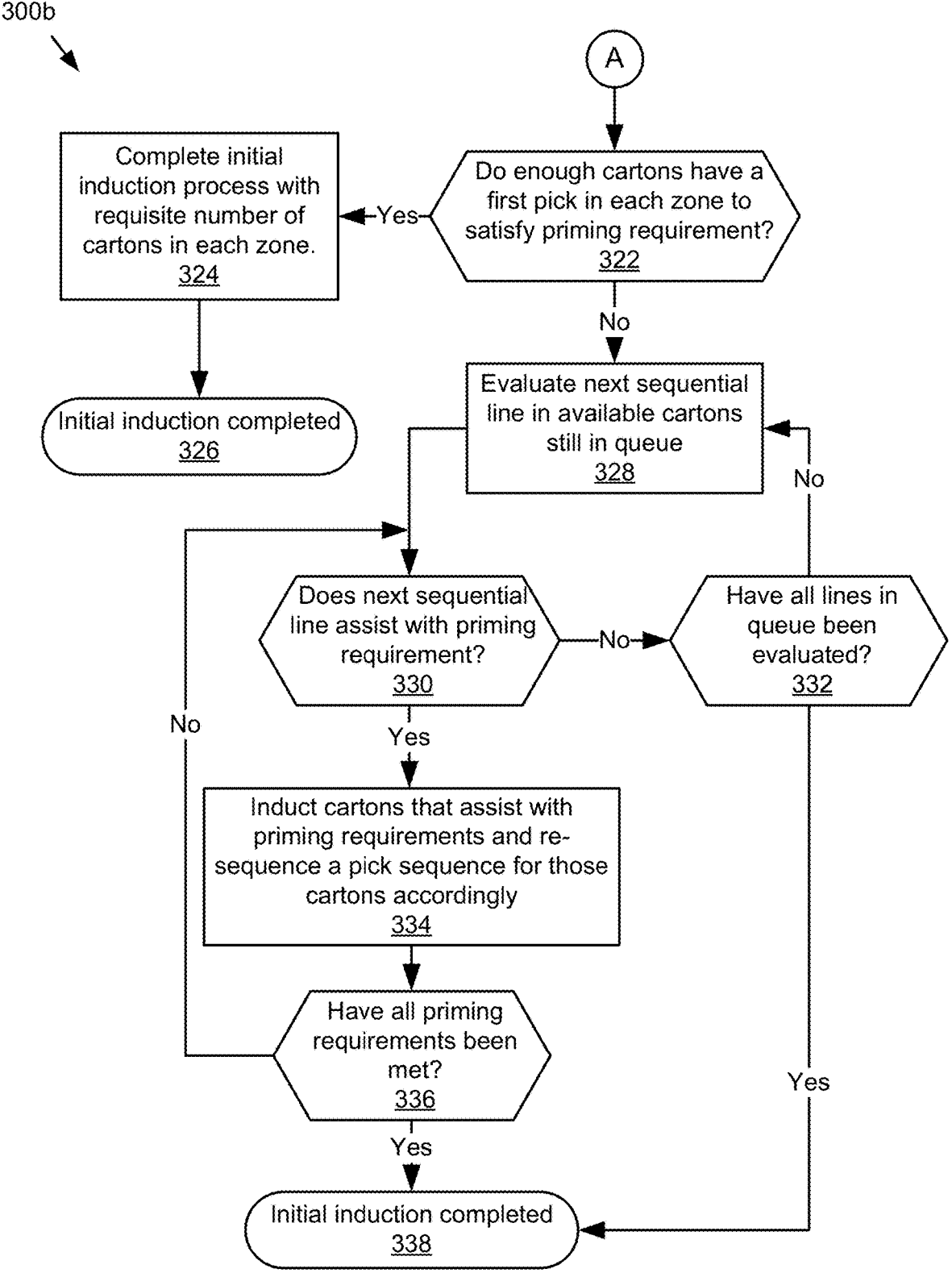
Figure 5A:
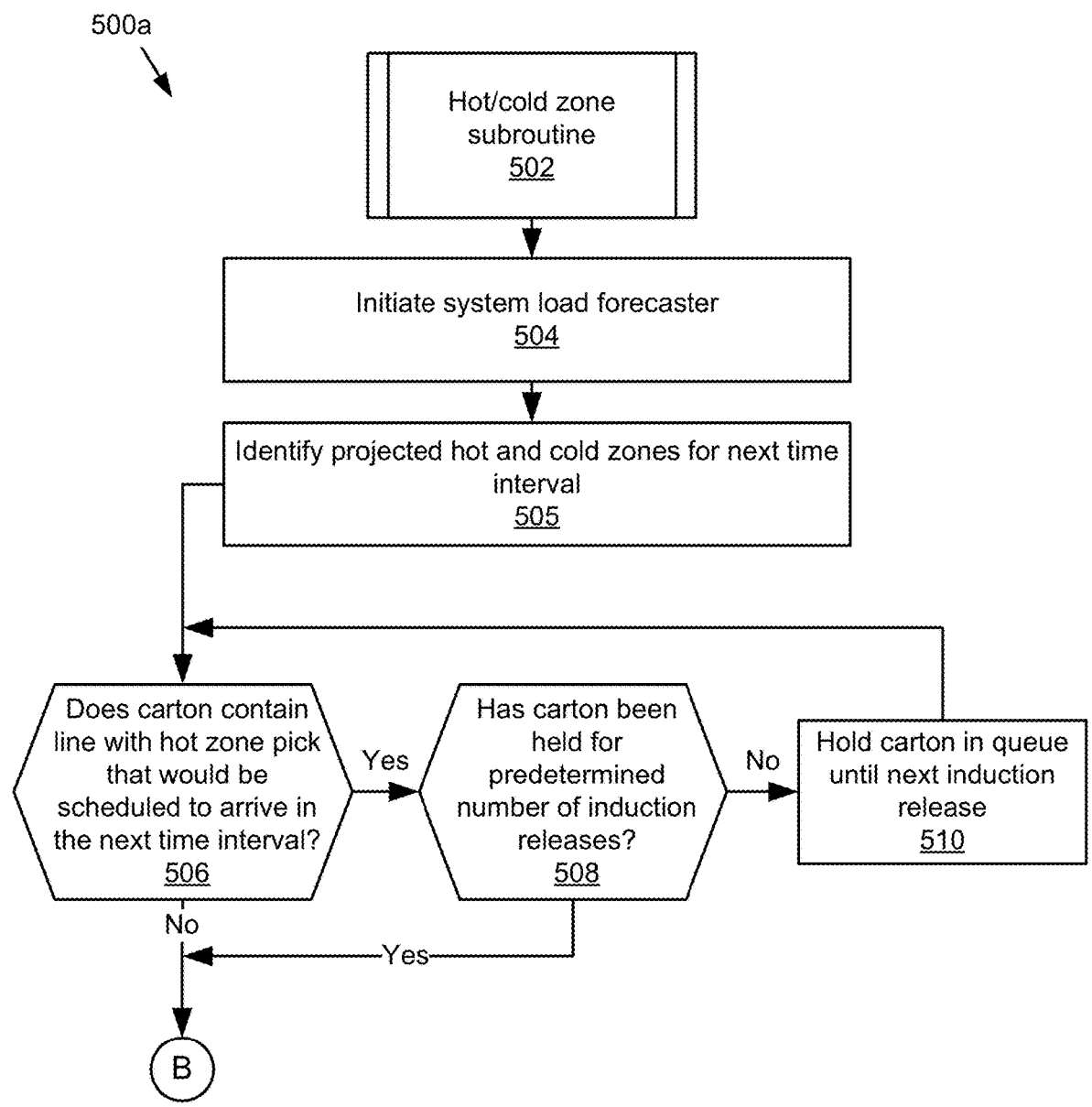
FIGS. 5A-5C are flowcharts of an example method for carton induction using a load forecast.
Figure 5B:
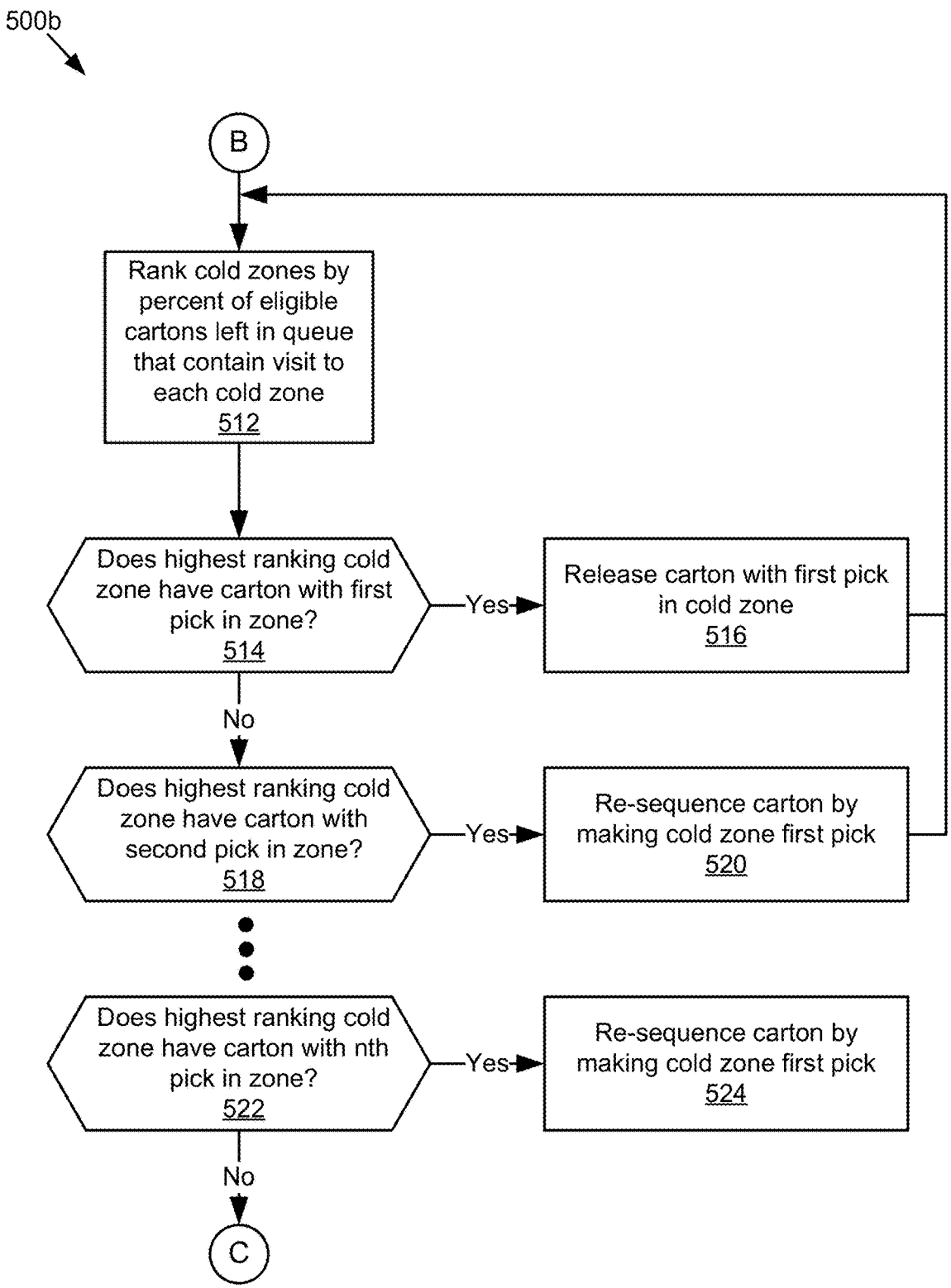
Figure 5C:
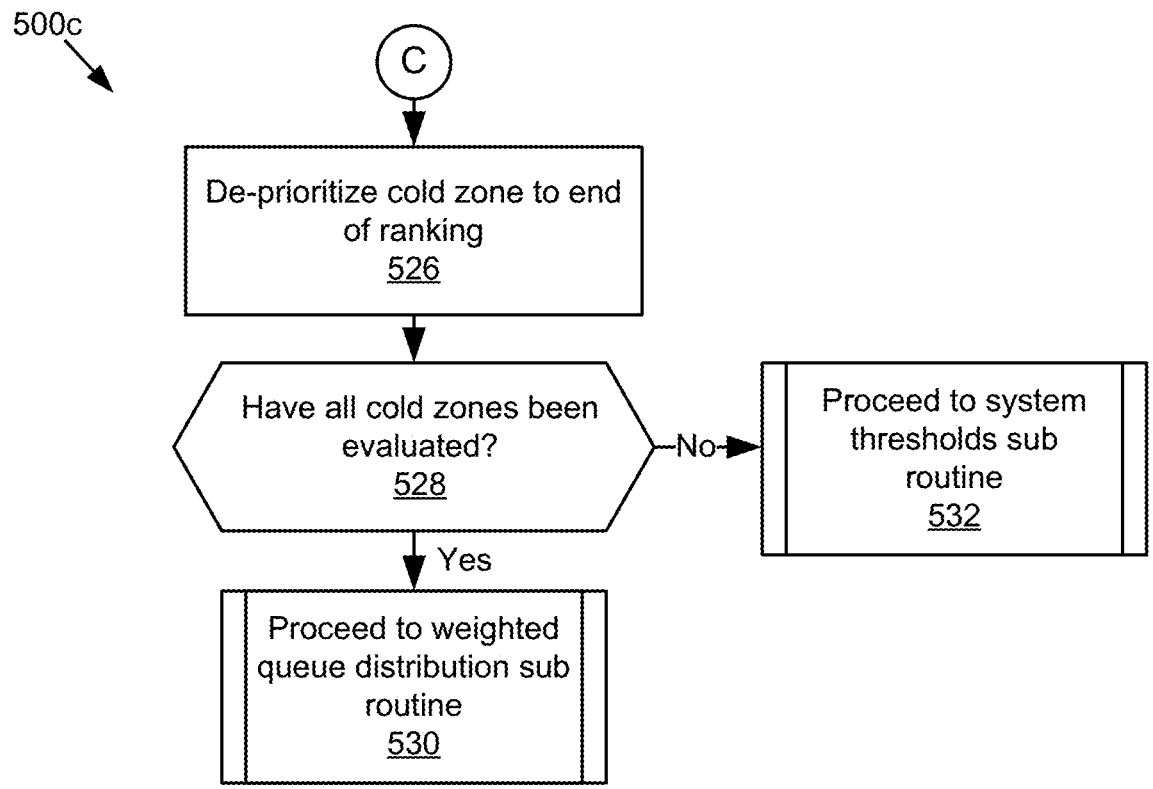

An example method 500 (500a, 500b, and 500c are illustrated in FIGS. 3A, 3B, and 3C, respectively) for carton induction using load forecast is depicted in FIGS. 5A-5C. At 502, the subroutine for generating a hot/cold determination is started and at 504, the container flow logic engine 114 initiates the system load forecaster 118. At 505, the load forecaster may identify projected hot and cold zones for the next time interval (e.g., 15 minutes, 30 minutes, etc.).

At 506, the container flow logic engine 114 determines whether the carton contains a line (e.g., the carton data indicates that the carton will pass through a picking line) which includes pick in a hot zone that would be scheduled to arrive in the next time interval. If the determination at 506 is negative, then the method 500 may proceed to 512 in FIG. 5B. In response to the determination at 506 being positive, then the container flow logic engine 114 may determine, at 508, if the carton has been held for a predetermined number (e.g., three in a row) of induction releases (e.g., instances or time periods during which cartons are inducted in the conveyor system).

In response to a determination at 508 being positive, the method 500 may continue to 512; however, if the determination at 508 is negative, then the method 500 may continue to 510, where the container flow logic engine 114 may hold the carton in queue until the next induction release. The method may then proceed to the operation at 506 for that carton.

At 512, the container flow logic engine 114 may rank cold zones by the percent of eligible cartons left in queue that contain a visit (e.g., are schedule to pass through) each of the cold zones. In some embodiments, re-ranking of cold zones may occur after every carton is added to the induction release for that wave/induction iteration. At 514, the container flow logic engine 114 may determine whether the highest ranking cold zone (e.g., the coldest or most under-utilized zone) has a carton with a first pick in the cold zone and, in response to a positive determination, the container flow logic engine 114 may issue an instruction to release the carton with the first pick in the cold zone, after which the method 500 may proceed to 512. In some embodiments, the release of the carton may be further based on a determination that the carton does not exceed 100% utilization of the zone.

In response to the determination at 514 being negative, the container flow logic engine 114 may determine, at 518, whether the highest ranking cold zone has a carton with a second pick in the cold zone and, in response to a positive determination, the container flow logic engine 114 may re-sequence, at 520, the carton by making the zone the first pick for the carton. In some embodiments, re-sequencing the carton at 520 may be further based on a determination that the carton does not exceed 100% utilization of the zone.

In response to the determination at 514 being negative, the container flow logic engine 114 may determine, at 522, whether the highest ranking cold zone has a carton with a third pick in the cold zone and, in response to a positive determination, the container flow logic engine 114 may re-sequence, at 524, the carton by making the zone the first pick for the carton. In some embodiments, re-sequencing the carton at 524 may be further based on a determination that the carton does not exceed 100% utilization of the zone.

In response to the determination at 522 being negative, the container flow logic engine 114 may de-prioritize, at 526, the cold zone to the end of the ranking and, at 528, the container flow logic engine 114 may determine whether all cold zones have been evaluated. In response to determining that all cold zones have been evaluated, the container flow logic engine 114 may proceed, at 530, to the weighted queue distribution sub routine, which is described in further detail in reference to FIG. 6. In response to determining that all cold zones have not been evaluated, the container flow logic engine 114 may proceed, at 532, to the weighted queue distribution sub routine, which is described in reference to FIG. 4.

Figure 5D:
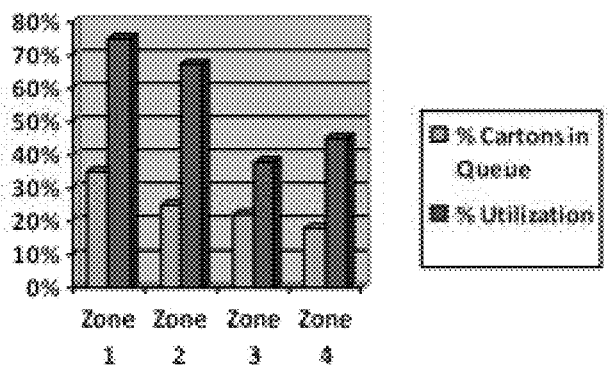
FIG. 5D is a graph illustrating picking zone utilization.

FIG. 5D is example graph 550 illustrating picking zone utilization. The graph 550 illustrates a system in which there are four zones. The graph 550 depicts the utilization percentage and percentage (e.g., utilization percentage) of the cartons in the queue for that zone. As illustrated, in some embodiments, the zones can be ranked based on the based on percent utilization, percent of cartons in the queue, a combination of these two factors, although it should be understood that other embodiments are possible.

Returning to FIG. 1, the WES 102 may store productivity information for each point (e.g., pick zone) in a non-transitory data store. The productivity information may reflect mechanical capacity of that given point of the conveyor system. In some cases, the mechanical capacity may be dynamic based on current conditions (e.g., staffing levels (e.g., number of associates working in zone), operational state, etc.).

The load forecaster 118 may generate recommended staffing allocations for a forecast, which require relocation of various associates to different zones based on forecasted demand in those zones. In response, associates working in the different pick zones may be reallocated based on the requirements of the cartons to be inducted into the system as estimated by the load forecaster 118. Further, the load forecaster 118 may provide recommendation data reflecting recommended slot balance, stock time recommendations for different zones, etc.

The container flow logic engine 114 may include an inductor 120 configured to select which containers to induct to the system at a given point in time. As discussed above, the actions may be based on containers currently in the conveyor system in their expected destinations before exiting the conveyor system, and the characteristics of the cartons available for induction.

An example method 300 (300a and 300b are illustrated in FIGS. 3A and 3B, respectively) for conducting one or more cartons in a conveying system is depicted in FIGS. 3A-3B. In some embodiments, the container flow logic engine 114 may use the following variables to select a container or batch of containers for induction: container priority, current availability (in stock) of product in pick medium, value adding activity and/or time to make a specific pick, weight and other dimensional characteristics of each item picked, staffing in pick zones, minimum/maximum threshold of containers in the entire system and specific module/level/zone, pre-induction system load forecast, post-induction system load forecast for the potential batch under consideration, percent of picks by zone in the queue for induction, specific section of system outages, and/or other user defined exceptions.

At 302, the WMS 104 or container flow logic engine 114 may process orders by control type, carton sizes, and drop cartons into WES 102 queue. For example, the WMS 104 may process orders by control type, carton sizes, and drop breakpack cartons (e.g., less than whole cartons or containers) into the WES 102 queue and, at 304, the WES 102 may identify pick zone visits for each carton (e.g., for an induction release, for a time period, etc.).

At 306, the container flow logic engine 114 may determine, for each carton, whether the carton has any pick line needing replenishment (e.g., is the carton scheduled to visit a pick zone that needs replenishment) and, in response to a positive determination, may issue an instruction, at 308, to hold the carton in queue until the next induction release. At 307, it may be determined whether there are additional cartons to process, and if there are additional cartons, then the method 300 proceeds to 306; however, if there are no additional cartons to process, the method 300 proceeds to 310.

In response to a negative determination at 306, or in some implementations, 307, the container flow logic engine 114 may determine, at 310, whether the current induction release/wave is the first induction wave of the day. In response to a positive determination at 310, the WES 102 may receive input, at 312, from a WES 102 a quantity selection selecting a number of cartons (e.g., a priming requirement) in each pick zone to begin the day (or other time period or session) and the method 300 may continue to 322.

In response to a negative determination at 310, the container flow logic engine 114 may initiate, at 314, the ETA forecaster 116 for each carton in the queue. The ETA forecaster 116 and associated operations are described in further detail elsewhere herein.

At 316, the container flow logic engine 114 may determine whether priority carton functionality is turned on (e.g., whether certain cartons are set/configured in the system to have priority over other cartons) and, in response to a positive determination, may release, at 318, the priority cartons for induction (e.g., in the current or next induction release wave). However, in response to a negative determination at 316, the container flow logic engine 114 may proceed, at 320, to the system thresholds sub routine. The system thresholds sub routine is described in reference to FIG. 4.

At 322, the container flow logic engine 114 may determine whether enough cartons have a first pick in each zone to satisfy the priming requirement and, in response to a positive determination, the initial induction process is completed with the required number of cartons in each zone at 324 and, at 326, the initial induction is complete.

In response to a negative determination at 322, the container flow logic engine 114 may evaluate, at 328, the next sequential line (e.g., a subsequent pick) in available cartons still in the queue and, at 330, the container flow logic engine 114 may determine whether the next sequential line satisfies the priming requirement.

In response to a determination at 330 that the next sequential line does not satisfy the priming requirement, the container flow logic engine 114 may determine, at 332, whether all lines in the queue have been evaluated. In response to determining that all lines in the available cartons in the queue have been evaluated, the method 300 may terminate at 338. In response to determining that not all lines in the available carton(s) in the queue have been evaluated, the method 300 may continue to the operation at 328.

In response to a determination at 330 that the next sequential line does satisfy the priming requirement, the container flow logic engine 114 may induct, at 334, cartons that satisfy the priming requirements and re-sequence the lines for the priming of those cartons to the first pick in a pick sequence.

At 336, the container flow logic engine 114 may determine whether the priming requirements (e.g., the requirements for each zone) have been met, for example, using the determined sequence. In response to determining that the priming requirements have not been met, the method 300 may return to the operation at 330. In response to determining that the priming requirements have been met, the method 300 may terminate at 338.

Figure 4:
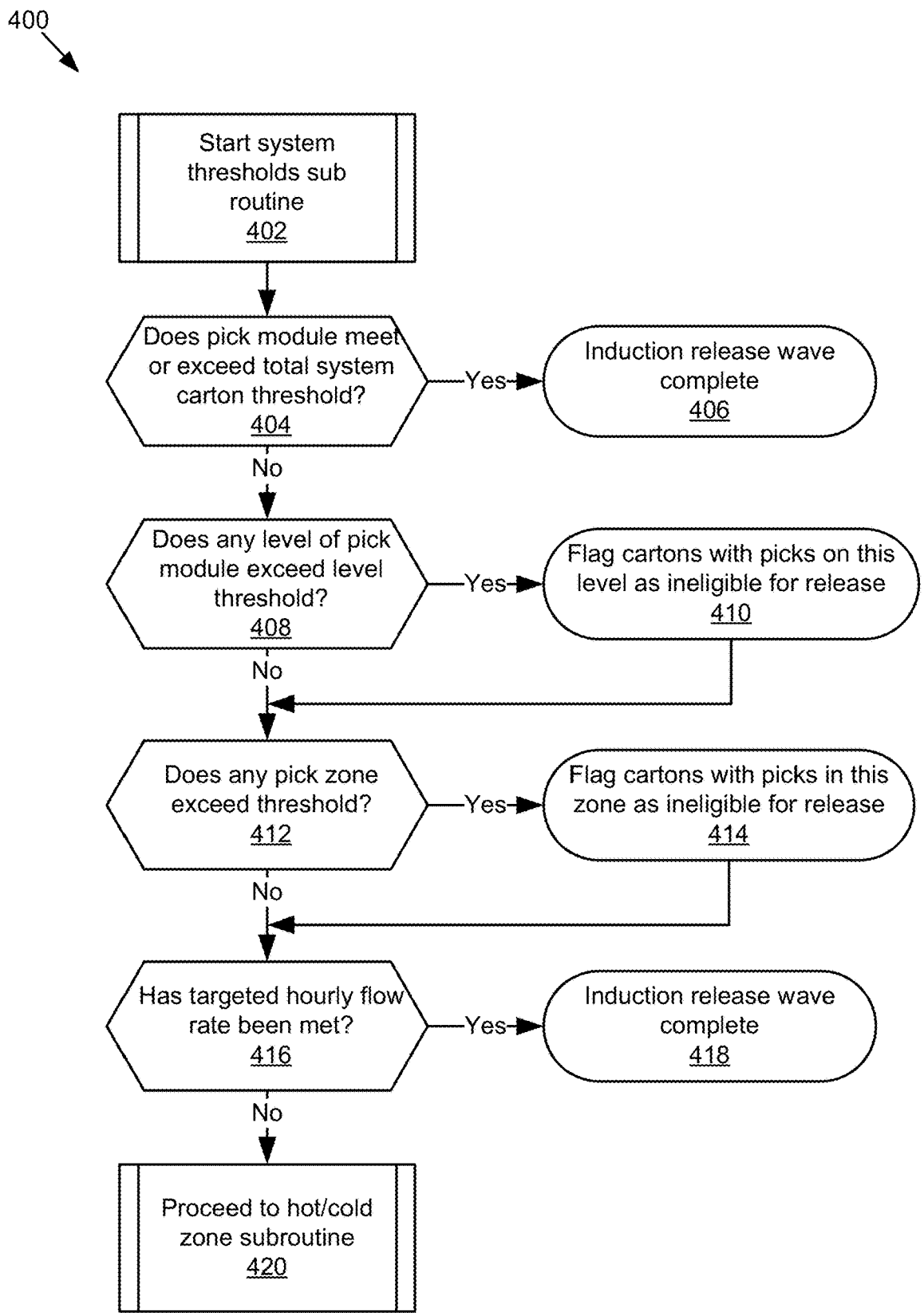
FIG. 4 is a flowchart of an example method for applying induction thresholds.

The inductor 120 may use various thresholds to determine which cartons to induct into to the system. Example induction thresholds and a corresponding method are depicted in FIG. 4, which is a flowchart of an example method 400 for applying induction thresholds.

The system thresholds sub routine may start at 402 and, at 404, the container flow logic engine 114 may determine whether the cartons in a pick module meets or exceeds the total system carton threshold (e.g., a threshold for the quantity of cartons the conveyor system can support, for example, as determined by conveyor system attributes or administrative settings) and, in response to a positive determination, the container flow logic engine 114 marks the induction release wave complete at 406.

In response to a negative determination at 404, the container flow logic engine 114 may determine, at 408, whether any level of the pick module exceeds the level threshold, and in response to a positive determination, may mark cartons with picks on the particular level of the pick module as ineligible for induction release at 410 and then proceed to the operation at 412.

In response to a negative determination at 408, the container flow logic engine 114 may determine, at 412, whether any pick zone exceeds the total system carton threshold, and in response to a positive determination, may mark cartons with picks on the particular zone as ineligible for induction release at 414 and then proceed to the operation at 416.

In response to a negative determination at 412, the container flow logic engine 114 may determine, at 416, whether a targeted hourly flow rate (e.g., as defined by a stakeholder or system capacity) has been met, and in response to a positive determination, the induction release wave may be complete at 418. In response to determining that the targeted hourly flow rate has been met at 416, the method 400 may proceed, at 420, to the hot and cold zone sub routine, which is described in reference to FIGS. 5A-5C.

Figure 6:
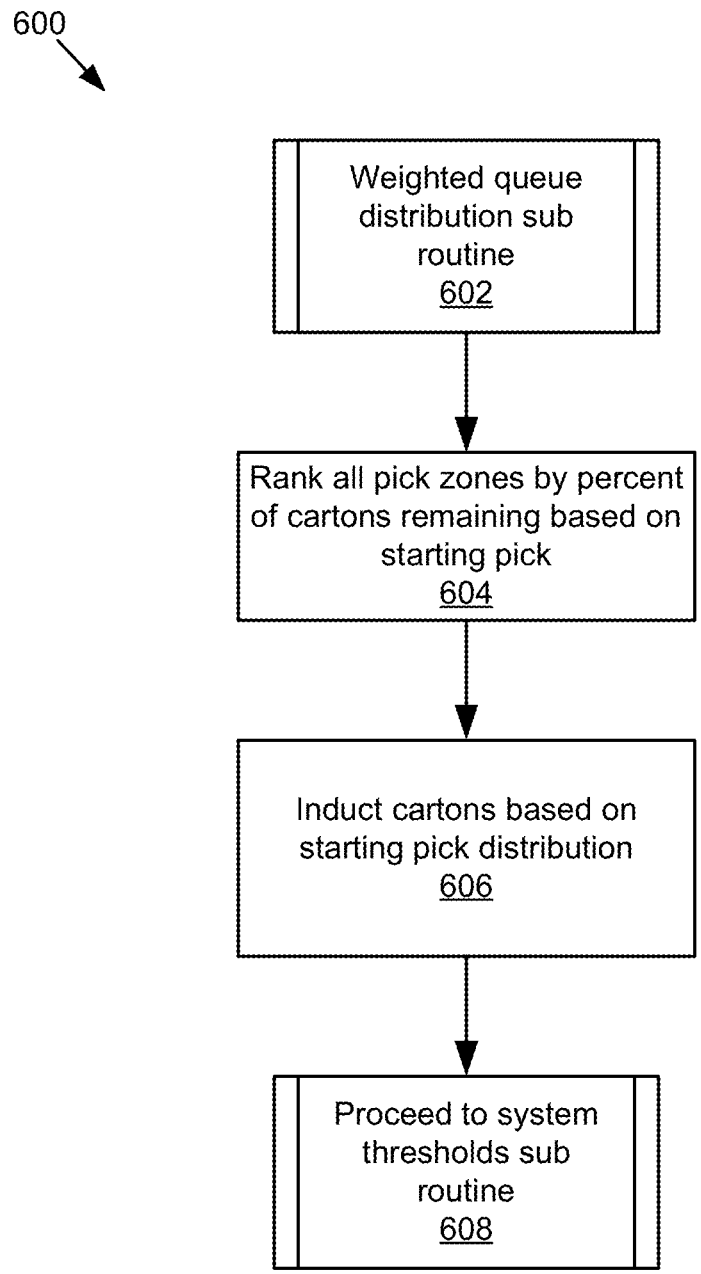
FIG. 6 is a flowchart of an example method for ranking pick zones using weighted queue distribution logic.

FIG. 6 is a flowchart of an example method 600 for ranking pick zones using weighted queue distribution logic. In some embodiments, the inductor 120 may learn from prior iterations. For example, when the targeted flow is not met by a prior batch inducted by the inductor 120, the inductor 120 may execute the example method 600 depicted in FIG. 6.

At 602, the weighted queue distribution sub routine starts and, at 604, the inductor 120 may rank the pick zones by percentage of cartons remaining in those zones. This may be determined by data reflecting that the cartons are still dwelling in these zones (e.g., scan data reflecting that the cartons have been diverted to those zones but no confirmatory input that the picks for those cartons were completed). In further examples, this may be based on starting pick.

At 606, the method 600 may induct cartons based on a starting pick distribution (e.g., a backlog or other distribution). In some instances, the method 600 may overload a given zone purposefully to force higher productivity by the pickers in that zone. In other instances, the method 600 may underload a zone to allow that zone to clear up. Other variations are also possible and contemplated.

At 608, the method may proceed to the system thresholds sub routine, which is described in reference to FIG. 4.

The container flow logic engine 114 can advantageously maximize the productivity within the logistics system by increasing the picker and system utilization, maximizing the throughput of the system by balancing the conveyor traffic and system load at any given time, minimizing container cycle time, and facilitating processing priority container by a specified time.

Figure 2:
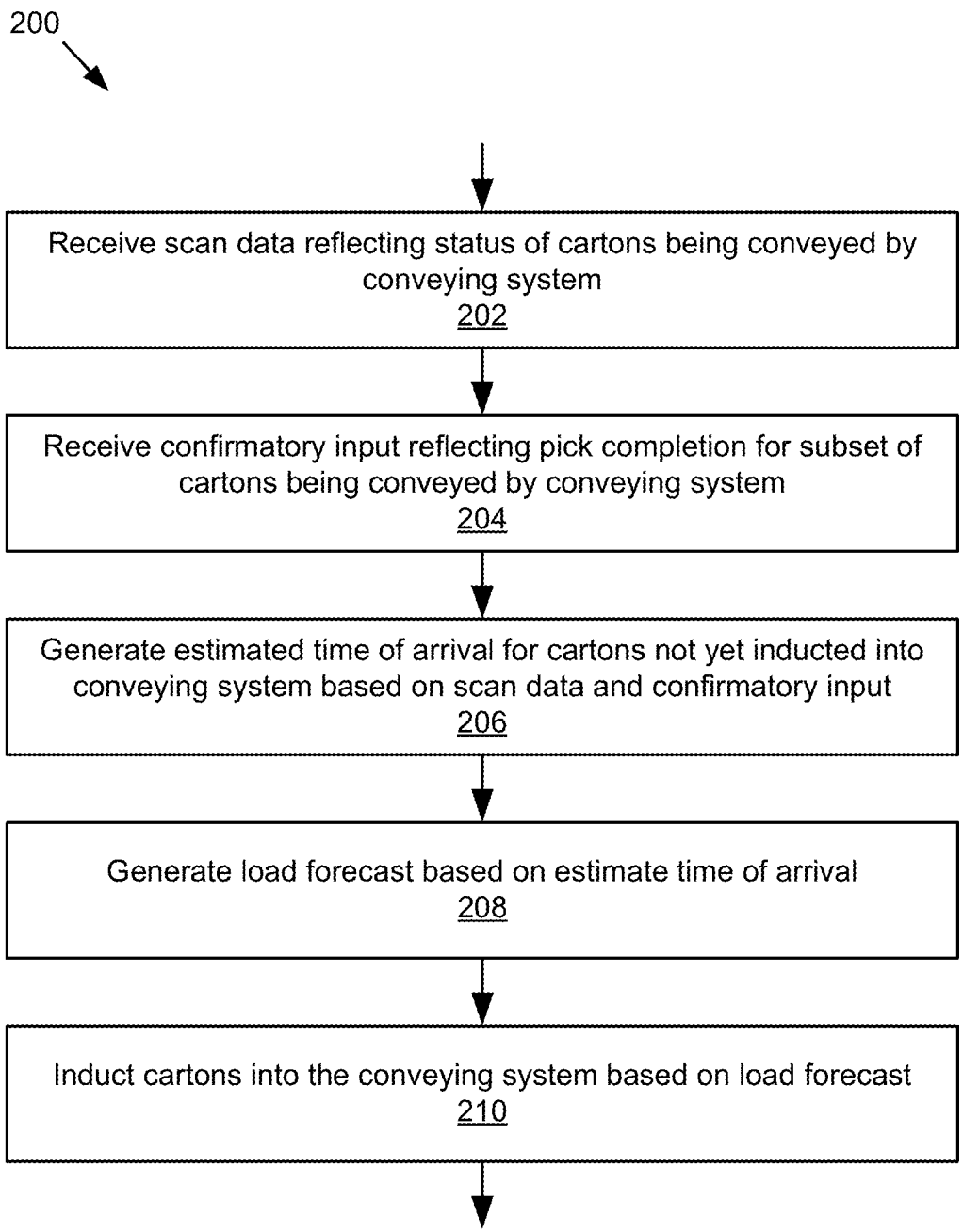
FIG. 2 is a flowchart of an example method for induction optimization in an order fulfillment picking system.

FIG. 2 is a flowchart of an example method 200 for induction optimization in a zone-to-zone conveyor order fulfillment picking system according to the techniques described herein. The operations described in reference to FIG. 2 may be performed by the container flow logic engine 114 (or one of its components, as described above) to optimize the container (i.e. outbound shipping cartons, envelopes or totes) flow of an each picking zone-to-zone conveyor system in an order fulfillment center. This method, as well as the other techniques described herein, are configured to maximize the productivity within a conveyor system by increasing picker and system utilization, maximize the throughput of the conveyor system by balancing conveyor traffic and system load at a given time, minimizes container cycle time and facilitates processing priority container by specified time.

At 202, the container flow logic engine 114 may receive scan data reflecting status of cartons being conveyed by a conveying system. The scan data may include scans of cartons into and/or out of a zone, conveyor velocity, or other carton, conveyor, system, or sensor data pertaining to the status of cartons being conveyed to and through a conveying system, for example. A zone dwell time may be determined, for example, using scans of a carton into and out of a zone. Zone dwell time may represent a duration of time that a carton spent in a given zone of the conveying system.

At 204, the container flow logic engine 114 may receive confirmatory input reflecting pick completion for a subset of the cartons being conveyed by the conveying system. Confirmatory input may include, for example, conveyor scanner confirmations, pick confirmations, or other inputs reflecting pick completion (whether at induction, completion, or at a zone in the conveying system), as described in further detail elsewhere herein.

At 206, the container flow logic engine 114 may generate an estimated time of arrival for one or more cartons not yet inducted into the conveying system based on the scan data and the confirmatory input. In some embodiments, the ETA forecaster 116 estimates the expected time of arrival of a carton or container (which may not currently be inducted in the system) at one or more pick zones (that the container is required to visit to get the necessary picks) from the point of induction based on a set of acceptable static/dynamic routes using a real time, or lag basis, as described in further detail elsewhere herein. Each outbound container can have either one or multiple (split case or break pack) pick lines. In order to get these pick lines fulfilled a container might need to visit one or more pick zones. In some embodiments, the estimated time of arrival may be calculated based on a combination of one or more of conveyor velocity of the conveying system, an expected destination of the cartons being conveyed by the conveying system, registered time between two successive scan points a container passes, dwell time of a container in a zone measured based on time diverted and time pick confirmed/pushed out and picker productivity.

At 208, the container flow logic engine 114 may generate a load forecast based on the estimated time of arrival. In some embodiments, the load forecast includes an estimate, for a given future point in time, of a carton load being processed by the conveyor system. In some embodiments, the load forecaster 118 estimates the number of cartons in every point of the conveyor system including zones, inclines, declines, accumulation and transportation conveyor sections at a given future point of time. The load forecaster 118 may further generate the load cast based on cartons currently in the system (e.g., specific ones or a quantity thereof) and their expected destinations before exiting the systems, and based on different selection choices of new batch of containers.

For example, the load forecaster 118 may leverage the current location of a carton in the conveyor system, outputs from ETA forecaster 116, and different selection choices of new batch of cartons. In some embodiments, generating the load forecast may include classifying sections (e.g., zones) of the conveying system as above a threshold load level or below the threshold load level. For instance, specific sections of conveyor including zones may be classified as hot or cold (for e.g. load above threshold is hot and load below threshold is cold) based on the load forecast and a user defined load threshold, as described in further detail, for example, in reference to FIGS. 5A-5C.

At 210, the container flow logic engine 114 may induct one or more of the one or more cartons into the conveying system based on the load forecast. The container flow logic engine 114 may optimize several input variables, as described in in further detail, for example, in reference to FIGS. 3A-3B. The container flow logic engine 114 may accordingly use the current system load, the forecast of system load based on current containers in the system, and the forecast of system load based on potential batch of containers considered to be inducted to optimize the flow and maximize the productivity, throughput while minimizing cycle time, as described in further detail elsewhere herein.

This logic can be integrated in to any conveyor control system, warehouse control system, warehouse execution system 102, warehouse management system 104 to manage the flow of containers in a zone to zone each picking order fulfillment system. This logic is capable of improving productivity, improving throughput and lowering cycle time resulting in significant savings and business value.

Figure 7:
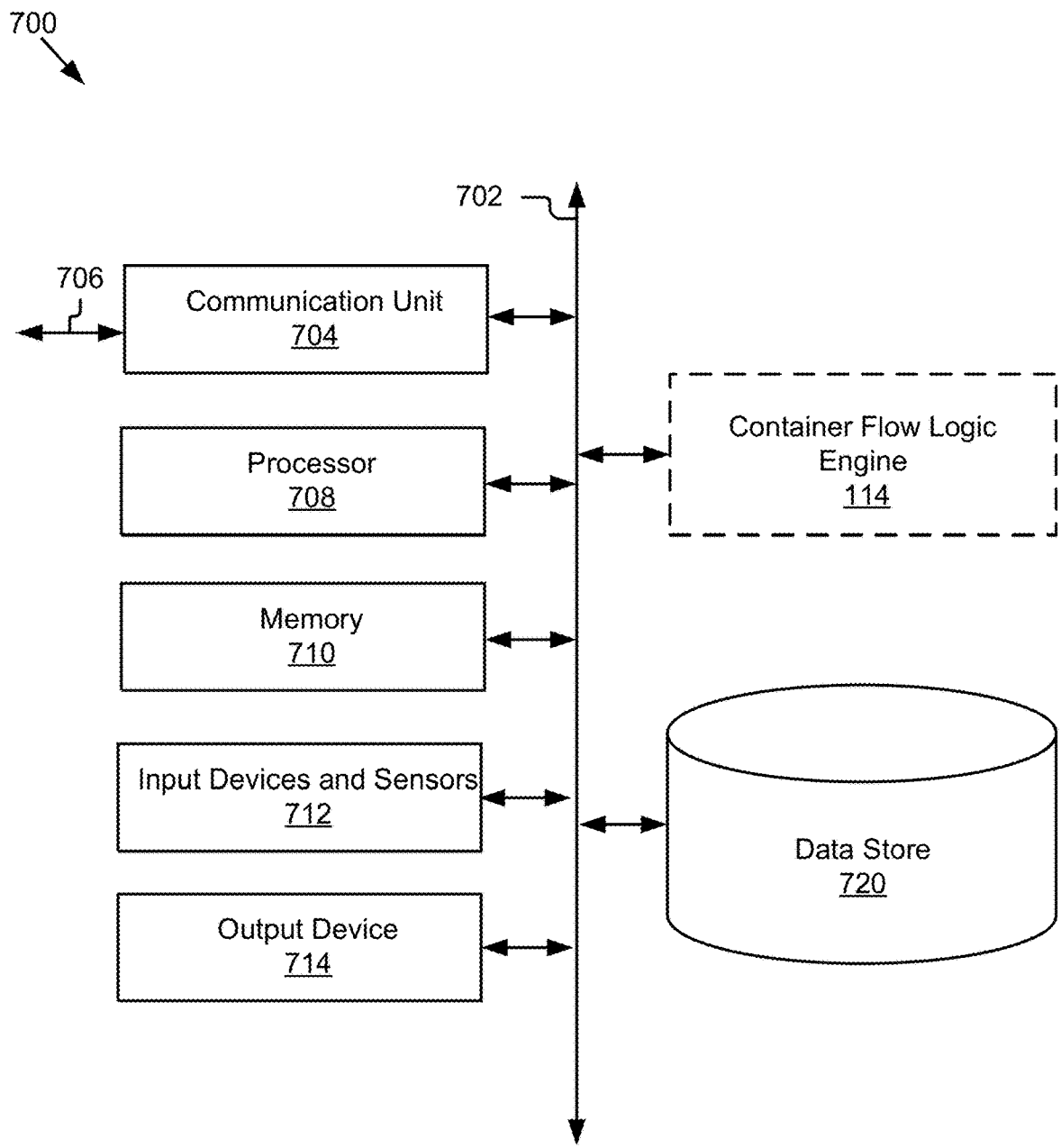
FIG. 7 is a block diagram illustrating an example computing system for induction optimization in an order fulfillment picking system.

FIG. 7 is a block diagram illustrating an example computing system 700 for implementing induction optimization in a zone-to-zone conveyor order fulfillment picking system. For example, the computing system 700 may represent the WES 102, a WMS 104, a picking system 106, a component of the automated induction equipment 108 or conveyor controls 110, etc., depending on the embodiment. As depicted in FIG. 7, the computing system 700 may include a container flow logic engine 114, depending on the configuration.

As depicted, the computing system 700 may include a communication unit 704, a processor 708, a memory 710, input devices and sensors 712, an output device 714, and a data store 720, which may be communicatively coupled by a communication bus 702. The computing system 700 depicted in FIG. 7 is provided by way of example and it should be understood that it may take other forms and include additional or fewer components without departing from the scope of the present disclosure. For instance, various components of the computing device may be coupled for communication using a variety of communication protocols and/or technologies including, for instance, communication buses, software communication mechanisms, computer networks, etc. While not shown, the computing system 700 may include various operating systems, sensors, additional processors, and other physical configurations. Although, for purposes of clarity, FIG. 7 only shows a single communication unit 704, processor 708, memory 710, input device/sensor 712, output device 714, and data store 720, it should be understood that the computing system 700 may include a plurality of one or more of these components.

The processor 708 may execute software instructions by performing various input, logical, and/or mathematical operations. The processor 708 may have various computing architectures to method data signals including, for example, a complex instruction set computer (CISC) architecture, a reduced instruction set computer (RISC) architecture, and/or an architecture implementing a combination of instruction sets. The processor 708, which may include one or more processors, may be physical and/or virtual, and may include a single core or plurality of processing units and/or cores. In some embodiments, the processor 708 may be capable of generating and providing electronic display signals to a display device, supporting the display of images, capturing and transmitting images, performing complex tasks including various types of feature extraction and sampling, etc. In some embodiments, the processor 708 may be coupled to the memory 710 via the bus 702 to access data and instructions therefrom and store data therein. The bus 702 may couple the processor 708 to the other components of the computing system 700 including, for example, the memory 710, the communication unit 704, the input device 712, the output device 714, and the data store 720.

The memory 710 may store and provide access to data to the other components of the computing system 700. The memory 710 may be included in a single computing device or a plurality of computing devices. In some embodiments, the memory 710 may store instructions and/or data that may be executed by the processor 708. For example, the memory 710 may store one or more of container flow logic engine 114, a WMS 104, a picking system 106, conveyor controls 110, etc., and/or their respective components, depending on the configuration. The memory 710 is also capable of storing other instructions and data, including, for example, an operating system, hardware drivers, other software applications, databases, etc. The memory 710 may be coupled to the bus 702 for communication with the processor 708 and the other components of computing system 700.

The memory 710 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 708. In some embodiments, the memory 710 may include one or more of volatile memory and non-volatile memory (e.g., RAM, ROM, hard disk, optical disk, etc.). It should be understood that the memory 710 may be a single device or may include multiple types of devices and configurations.

The bus 702 can include a communication bus for transferring data between components of a computing device or between computing devices, a network bus system including a network or portions thereof, a processor mesh, a combination thereof, etc. In some embodiments, various other components operating on the computing system 700 (operating systems, device drivers, etc.) may cooperate and communicate via a communication mechanism included in or implemented in association with the bus 702. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 704 may include one or more interface devices (I/F) for wired and wireless connectivity among the components the system 100. For instance, the communication unit 704 may include, but is not limited to, various types known connectivity and interface options. The communication unit 704 may be coupled to the other components of the computing system 700 via the bus 702. The communication unit 704 may be coupled to the network as illustrated by the signal line 706, depending on the configuration. In some embodiments, the communication unit 704 can link the processor 708 to a network (e.g., the Internet, an intranet, etc.), which may in turn be coupled to other processing systems. The communication unit 704 can provide other connections to a network and to servers or computing devices using various standard communication protocols.

The input devices and sensors 712 may include any device for inputting information into the computing system 700. In some embodiments, the input device 712 may include one or more peripheral devices. For example, the input device 712 may include a keyboard, a pointing device, microphone, an image/video capture device (e.g., camera), a touch-screen display integrated with the output device 714, etc. The sensors 712 may include conveyor velocity sensors, carton presence or position sensors, conveyor scanners 112, pick confirmation scanners, etc.

The output device 714 may be any device capable of outputting information from the computing system 700. The output device 714 may include one or more of a display (LCD, OLED, etc.), a printer, a 3D printer, a haptic device, audio reproduction device, touch-screen display, etc. In some embodiments, the output device is a display, which may display electronic images and data output by the computing system 700 for presentation to a user (e.g., an administrator of the WMS 104 or WES 102). In some embodiments, the computing system 700 may include a graphics adapter (not shown) for rendering and outputting the images and data for presentation on output device 714. The graphics adapter (not shown) may be a separate processing device including a separate processor and memory (not shown) or may be integrated with the processor 708 and memory 710.

The data store 720 is an information source for storing and providing access to data. The data stored by the data store 720 may be organized and queried using various criteria including any type of data stored by them, such as carton data, sensor data, conveyor attributes, operator efficiency and position, etc. The data store 720 may include data tables, databases, or other organized collections of data. An example of the types of data stored by the data store 720 may include, but is not limited to carton data, sensor data, conveyor attributes, operator efficiency and position, etc. In some instances, the data store 720 may also include, carton data, conveying system attributes, etc.

The data store 720 may be included in the computing system 700 or in another computing system and/or storage system distinct from but coupled to or accessible by the computing system 700. The data store 720 can include one or more non-transitory computer-readable mediums for storing the data. In some embodiments, the data store 720 may be incorporated with the memory 710 or may be distinct therefrom. In some embodiments, the data store 322 may store data associated with a database management system (DBMS) operable on the computing system 700. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein, for example, in reference to FIGS. 1 and 7 may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   receiving data representing a set of cartons associated with a conveying system;
   identifying a pick-zone visit for each carton in the set of cartons, the pick-zone visit for each carton indicating a pick zone among one or more pick zones in the conveying system at which an item is assigned to be placed in that carton;
   identifying a high-load pick zone and one or more low-load pick zones based on the identified pick-zone visits for the set of cartons, the high-load pick zone having a load of picks above a first threshold, and the one or more low-load pick zones having a load of picks below a second threshold;
   selecting one or more cartons of the set of cartons for a current induction release based on identified visits of the one or more cartons to one or more of the high-load pick zone and the one or more low-load pick zones;
   determining that a first carton of the set of cartons has a priority status, the priority status indicating priority over at least one other carton of the set of cartons in the conveying system; and
   responsive to determining that the first carton has the priority status, inducting the first carton into the conveying system in the current induction release based on the priority status.

2. The computer-implemented method of claim 1, further comprising:
   identifying a second carton of the set of cartons, the pick-zone visit of the second carton having a pick zone needing replenishment; and
   marking the second carton as ineligible for the current induction release.

3. The computer-implemented method of claim 1, further comprising:
   generating an estimated time of arrival for one or more cartons from the set of cartons that are not yet inducted into the conveying system based on scan data and a confirmatory input, the scan data indicating a status of one or more cartons of the set of cartons that are being conveyed by the conveying system, the confirmatory input indicating a pick completion for a subset of the cartons being conveyed by the conveying system.

4. The computer-implemented method of claim 1, further comprising:
   determining that a certain pick zone of the one or more pick zones causes the conveying system to exceed a total system carton threshold; and
   marking a carton of the set of cartons having a pick-zone visit in the certain pick zone as ineligible for the current induction release.

5. The computer-implemented method of claim 1, further comprising:
   generating a load forecast for the one or more pick zones in the conveying system based on the identified pick-zone visit for each carton in the set of cartons; and
   inducting one or more of the set of cartons into the conveying system based on the load forecast.

6. The computer-implemented method of claim 1, further comprising:
   determining that a second carton of the set of cartons includes a pick-zone visit to the high-load pick zone;
   determining that the second carton has been held for a predetermined number of induction releases; and
   responsive to determining that the second carton has been held for the predetermined number of induction releases, selecting the second carton for the current induction release.

7. The computer-implemented method of claim 1, further comprising:
   determining that a second carton of the set of cartons includes a pick-zone visit to the high-load pick zone; and
   holding the second carton of the set of cartons to a later induction release.

8. The computer-implemented method of claim 1, further comprising:
   ranking the one or more low-load pick zones based on a quantity of cartons having a pick-zone visit to each of the one or more low-load pick zones;
   identifying a second carton with a first pick-zone visit to a particular low-load pick zone of the one or more low-load pick zones based on the ranking of the one or more low-load pick zones; and
   inducting the second carton into the conveying system.

9. The computer-implemented method of claim 1, further comprising:
   determining that the current induction release is a first induction release of a pick session; and
   responsive to determining that the current induction release is the first induction release of the pick session, determining a priming requirement indicating a number of cartons of the set of cartons to prime in each of the one or more pick zones to begin the pick session.

10. The computer-implemented method of claim 9, further comprising:
   determining that there is a sufficient quantity of cartons in the set of cartons that have a first pick-zone visit in each of the one or more pick zones to satisfy the priming requirement; and
   responsive to determining that there is the sufficient quantity of cartons to satisfy the priming requirement, performing the current induction release.

11. The computer-implemented method of claim 9, further comprising:
   determining that there is an insufficient quantity of cartons in the set of cartons that have a first pick-zone visit in each of the one or more pick zones to satisfy the priming requirement; and
   responsive to determining that there is the insufficient quantity of cartons to satisfy the priming requirement, performing the current induction release.

12. A system comprising:
   one or more processors; and
   a non-transitory computer readable medium storing instructions that, when executed by the one or more processors, are configured to perform operations including:
      receiving data representing a set of cartons associated with a conveying system;
      identifying a pick-zone visit for each carton in the set of cartons, the pick-zone visit for each carton indicating a pick zone among one or more pick zones in the conveying system at which an item is assigned to be placed in that carton;
      determining that a first carton of the set of cartons has a priority status, the priority status indicating priority over at least one other carton of the set of cartons in the conveying system;
      determining that a current induction release is a first induction release of a pick session;
      responsive to determining that the current induction release is the first induction release of the pick session, determining a priming requirement indicating a number of cartons of the set of cartons to prime in each of the one or more pick zones to begin the pick session; and
      responsive to determining that the first carton has the priority status, inducting the first carton into the conveying system in the current induction release based on the priority status.

13. The system of claim 12, wherein the operations further comprise:
   identifying a second carton of the set of cartons, the pick-zone visit of the second carton having a pick zone needing replenishment; and
   marking the second carton as ineligible for the current induction release.

14. The system of claim 12, wherein the operations further comprise:
   determining that there is a sufficient quantity of cartons in the set of cartons that have a first pick-zone visit in each of the one or more pick zones to satisfy the priming requirement; and
   responsive to determining that there is the sufficient quantity of cartons to satisfy the priming requirement, performing the current induction release.

15. The system of claim 12, wherein the operations further comprise:
   determining that there is an insufficient quantity of cartons in the set of cartons that have a first pick-zone visit in each of the one or more pick zones to satisfy the priming requirement; and
   responsive to determining that there is the insufficient quantity of cartons to satisfy the priming requirement, performing the current induction release.

16. The system of claim 12, wherein the operations further comprise:
   generating an estimated time of arrival for one or more cartons from the set of cartons that are not yet inducted into the conveying system based on scan data and a confirmatory input, the scan data indicating a status of one or more cartons of the set of cartons that are being conveyed by the conveying system, the confirmatory input indicating a pick completion for a subset of the cartons being conveyed by the conveying system.

17. The system of claim 12, wherein the operations further comprise:
   determining that a certain pick zone of the one or more pick zones causes the conveying system to exceed a total system carton threshold; and
   marking a carton of the set of cartons having a pick-zone visit in the certain pick zone as ineligible for the current induction release.

18. A computer-implemented method comprising:
   receiving data representing a set of cartons associated with a conveying system;
   identifying a pick-zone visit for each carton in the set of cartons, the pick-zone visit for each carton indicating a pick zone among one or more pick zones in the conveying system at which an item is assigned to be placed in that carton;
   determining that a first carton of the set of cartons has a priority status, the priority status indicating priority over at least one other carton of the set of cartons in the conveying system;
   identifying a second carton of the set of cartons, the pick-zone visit of the second carton having a pick zone needing replenishment;
   marking the second carton as ineligible for a current induction release;
   determining that a certain pick zone of the one or more pick zones causes the conveying system to exceed a total system carton threshold;
   marking a third carton of the set of cartons having a pick-zone visit to the certain pick zone as ineligible for the current induction release; and
   inducting the first carton into the conveying system in the current induction release based on the priority status.

19. A computer-implemented method comprising:
   receiving data representing a set of cartons associated with a conveying system;
   identifying a pick-zone visit for each carton in the set of cartons, the pick-zone visit for each carton indicating a pick zone among one or more pick zones in the conveying system at which an item is assigned to be placed in that carton;
   determining that a first carton of the set of cartons has a priority status, the priority status indicating priority over at least one other carton of the set of cartons in the conveying system;
   identifying a second carton of the set of cartons, the pick-zone visit of the second carton having a pick zone needing replenishment;
   marking the second carton as ineligible for a current induction release; and responsive to determining that the first carton has the priority status, inducting the first carton into the conveying system in the current induction release based on the priority status.

20. A computer-implemented method comprising:

receiving data representing a set of cartons associated with a conveying system;

identifying a pick-zone visit for each carton in the set of cartons, the pick-zone visit for each carton indicating a pick zone among one or more pick zones in the conveying system at which an item is assigned to be placed in that carton;

determining that a first carton of the set of cartons has a priority status, the priority status indicating priority over at least one other carton of the set of cartons in the conveying system;

determining that a certain pick zone of the one or more pick zones causes the conveying system to exceed a total system carton threshold;

marking a carton of the set of cartons having a pick-zone visit in the certain pick zone as ineligible for a current induction release; and responsive to determining that the first carton has the priority status, inducting the first carton into the conveying system in the current induction release based on the priority status.

* * * * *